Nov. 16, 1965 W. A. ROWLETT 3,218,098
IDLER ARM BEARING
Filed July 26, 1963
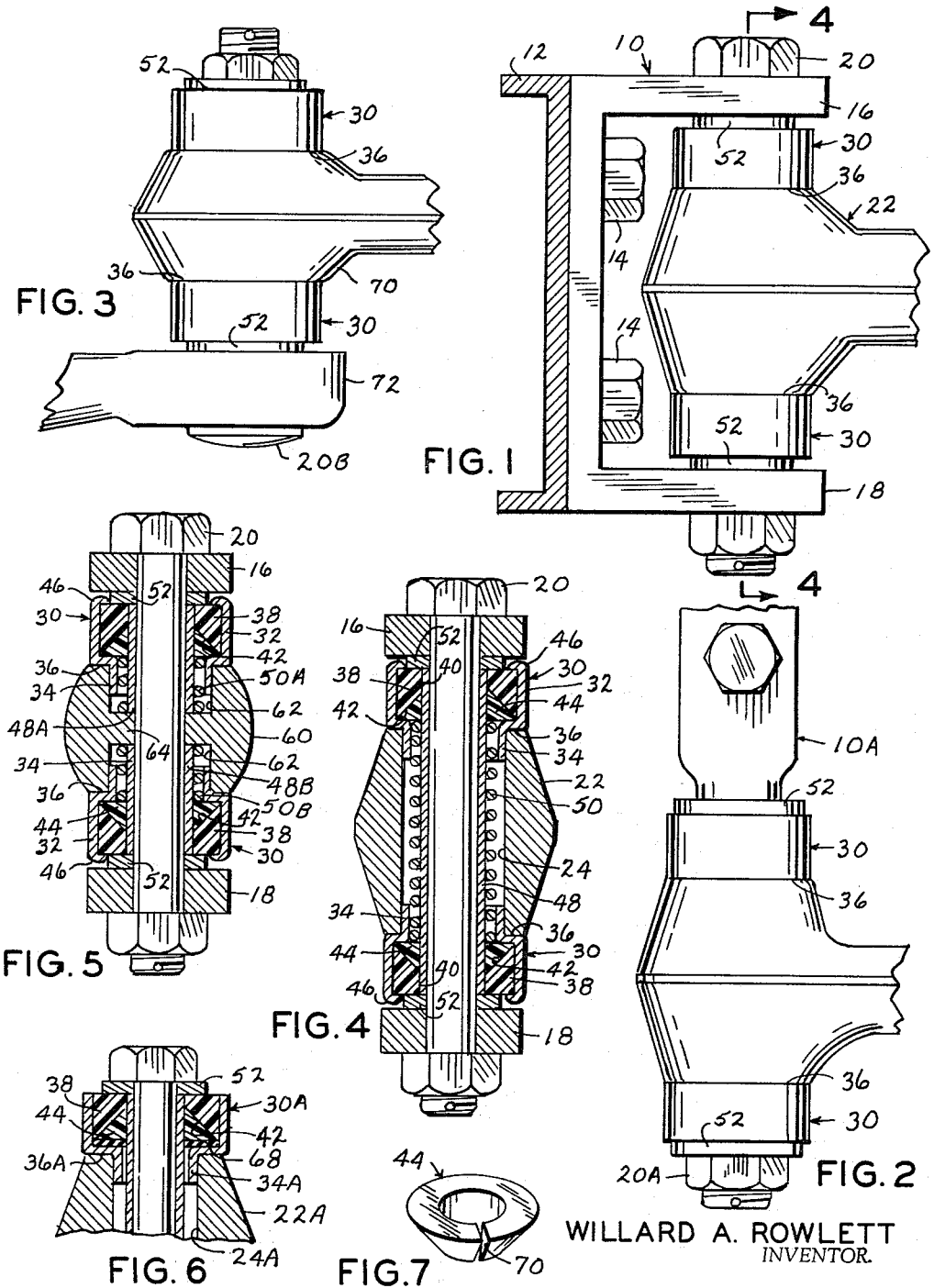
WILLARD A. ROWLETT
INVENTOR.
BY
Robert K. Rhea
AGENT

# United States Patent Office 3,218,098
Patented Nov. 16, 1965

3,218,098
IDLER ARM BEARING
Willard A. Rowlett P.O. Box 14–W,
Oklahoma City, Okla.
Filed July 26, 1963, Ser. No. 297,878
5 Claims. (Cl. 287—100)

The present invention relates to automobiles and more particularly to a repair or replacement kit for new and worn idler arm bearings and brackets of automobiles.

The present invention is a continuation-in-part of an application filed by me in the United States Patent Office on October 27, 1961, under Serial Number 148,219 for Idler Arm Repair Kit now Patent Number 3,124,394.

It is conventional practice, at present, to equip the righthand side of the steering mechanism of an automobile wtih an idler arm to support that side of the steering means. The idler arm comprises a relatively short member which is pivotally connected at one end to the adjacent righthand end portion of the tie rod and is pivotally connected at its opposite end to a bracket carried by the frame of the vehicle. The purpose of the idler arm is to add support and stability to the steering mechanism and effect easier steering. Since the idler arm assembly is continuously exposed to the weather, sand, grit and foreign matter, enters the connections of most conventional idler arms and in as much as the idler arm bearings are subjected to continuous oscillating movement, the conventional bearings wear rapidly. One type of idler arm bearing or conversion kit is disclosed in Patent No. 2,826,466, issued to Arnold J. Pritchard on March 11, 1958, wherein bearings securely maintain the idler arm connected to its bracket. A similar means for connecting an oscillating member to a fixed shaft is disclosed in Patent No. 2,392,633, issued to Carroll M. Bierman, dated January 8, 1946. Each of the above patents connects the relative oscillating parts by bearings but do not provide a means for maintaining a snug fit between mating parts throughout the life of the devices.

It is, therefore, the principal object of the instant invention to provide a bearing means for interconnecting an idler arm bracket to its support wherein the bearing means is spring-loaded and guided to maintain the component parts of the bearing in alignment and under a desired tension.

Another object is to provide a device of this class which, when installed on a vehicle, effects a permanent repair, lasting substantially as long as the vehicle is used.

Another object is to provide a bearing device of this class comprising relatively few moving parts which are formed of antifriction material capable of withstanding relatively high pressure and sealing with the bearing retaining surfaces.

Another important object is to provide a bearing means for interconnecting the ends of the idler arm with the tie rod and idler arm bracket which will eliminate idler arm wear, rattle, sagging and looseness of its connection.

A further object is to provide bearing means of this type by which a positive setting of wheel toe in and alignment may be achieved and which will be maintained under road shock encountered by the vehicle wheels.

Yet another object is to provide a device of this class which effects easier steering and control of the vehicle and prevents extensive tire wear by preventing constant caster and camber changes.

The present invention accomplishes these and other objects by providing a housed bearing means which may be inserted into the bore of an idler arm around a connecting bolt or the fixed shaft of an idler arm bracket and which includes a guide and resilient means for maintaining the component parts of the bearing aligned and under tension.

Other objects will be apparent from the following description when taken in conjunction with the accompanying single sheet of drawings, wherein:

FIGURE 1 is a side elevational view, partly in section, of the assembled bearing connecting an idler arm to a bracket;

FIGURE 2 is a side elevational view of the device connecting a fragmentary end of an idler arm to a different type bracket;

FIGURE 3 is a side elevational view of the device connecting fragmentary arm end portions as a relay assembly;

FIGURE 4 is a vertical cross-sectional view taken substantially along the line 4—4 of FIG. 1;

FIGURE 5 is a view similar to FIG. 4 illustrating an alternate embodiment of the device when connected with an alternate type idler arm;

FIGURE 6 is a fragmentary vertical cross-sectional view illustrating an alternate embodiment of the bearing means; and, FIGURE 7 is a perspective view of one of the bearing members.

Like characters of reference designate like parts in those figures of the drawings in which they occur.

In the drawings:

The reference numeral 10 represents an idler arm bracket connected to the frame 12 of a vehicle, not shown, by bolts 14. The bracket 10 is substantially U-shaped having parallel arms 16 and 18 alignedly apertured for receiving a bolt and nut 20 connecting an idler arm end portion 22 to the bracket. The spacing between the bracket arms 16 and 18 is substantially greater than the transverse dimension of the end portion of the idler arm 22 for receiving bearings which hold the idler arm to the bolt 20 for oscillating movement of the idler arm relative to the bracket. The idler arm end is transversely apertured, as at 24, for receiving the bolt and bearings.

The bearing means is indicated generally by the numeral 30 and in the present example two of the bearing assemblies 30 are used. The bearing assembly 30 is cylindrical in general configuration and includes a bearing receiving end portion 32 and a coaxially reduced cylindrical portion 34 forming an annular shoulder 36.

A centrally bored bearing race 38 is coextensive with and closely received by the inner surface of the housing wall 32. The race 38 is preferably formed of a highly flexible material having a high density such as polyethylene derived from petroleum resin presently marketed under the trade names Teflon, Delrin, Marlex and nylon. This material has an inherent antifriction quality and must be caged or enclosed when used as a bearing and placed under pressure. The rate 38 is further characterized by a central bore 40 and a tapered or conical-shaped surface or recess 42 intersecting the bore 40, intermediate the ends of the race, and the circumferential edge of the race at the inwardly disposed end of the latter.

A centrally bored conical-shaped bearing member 44, formed of similar synthetic or phenolic material, contiguously contacts the conical-shaped recess 42 of the race with its bore coaxially aligned with the bore 40 of the race. The end edge of the bearing 44, opposite its conical-shaped surface, contacts the housing shoulder 36. The race and bearing are maintained within the housing end 32 in any conventional manner such as a lock ring, not shown, or by rolling over the free end edge of the housing, as at 46.

A tubular sleeve or guide 48 is snugly received coaxially by the aligned bores of the race 38 and bearing 44. The bolt 20 extends through the guide 48. A helical spring 50 surrounds the guide 48 with its respective end portions positioned within the reduced end portion 34 of the housing around the guide 48 so that the spring 50 maintains constant pressure against the adjacent flat end surface of the respective bearing member 44. A washer 52 is interposed between the respective bracket legs 16 and 18 and the adjacent end surface of the respective bearing race 38. The washer 52 may be cup-shaped so that a felt gasket or other sealing means, not shown, may be interposed between the respective washer 52 and the adjacent race 38.

The cross-sectional end of a different type of idler arm is shown in FIG. 5 and indicated by the numeral 60 wherein the bearing receiving bore 62 in the idler arm defines a central web portion 64 having a bore 66 which receives the bolt 20 but is diametrically too small to receive the guide 48. In this embodiment the guide 48 is split or formed in two sections 48A and 48B. The guides 48A and 48B extend from the respective inward end surface, defining the inner limit, of the bearing receiving bore 62 to the outer limit of the respective bearing race 38 to maintain the respective race 38 and bearing 44 coaxially aligned. Similarly a pair of springs 50A and 50B surround the respective guide 48A and 48B and bear against the adjacent surface of the web 64 and bearing 44.

An additional alternate arrangement of the bearing means is illustrated in FIG. 6 wherein the bore 24A of the idler arm 22A is too small to receive the spring 50 between the inner surface of the reduced end portion 34A of the housing 30A and the periphery of the guide 48. The bearing 44 and race 38 are maintained within the housing 30A by the washer 52. In this embodiment the spring 50 is omitted and a resilient washer 68, preferably formed of synthetic resilient material, is interposed between the bearing 44 and housing shoulder 36A, which forms a seal with the adjacent end of the bearing member 44 to prevent rotation of the latter with the race 38 as the idler arm end 22A oscillates. Since the material used in forming the race 38 and bearing 44 tends to shrink after casting, the bearing 44 may be split or slotted, as at 70 (FIG. 7), so that the bearing will more easily conform to the periphery of the guide 48 and the space defined by the conical recess 42 and reduce friction.

*Operation*

In operation of a vehicle the idler arm 22 pivots or oscillates to and fro around the bolt 20. Forces applied to the idler arm tends to form a rocking action of the arm with respect to the bolt. This type of action, which is continuous while a vehicle is in operation, places considerable strain or stress on the bearings supporting the idler arm. The guide 48, surrounding the bolt 20 and impinged between the washers 52, maintains the bearing components 38 and 44 coaxially aligned. The springs 50, 50A and 50B, or resilient washer 68, bear against the inwardly disposed end surface of the respective bearing member 44 to hold the latter stationary with respect to the bolt 20 and guide 48 so that the oscillating movement of the idler arm rotating the bearing housing 30 rotates the race 38 with respect to the bearing 44 and forms a bearing surface defined by the recess 42 contacting the conical surface of the bearing 44 which receives the rotating action in a friction reducing manner.

FIGURE 2 illustrates the use of the bearings 30 in connecting an alternate idler arm bracket 10A to an idler arm. The bracket 10A includes a stud or bolt member 20A which functions in a manner similar to the bolt 20.

FIGURE 3 illustrates a relay type connection for idler arm end portions 70 and 72 wherein a bolt 20B is similarly extended through a pair of bearings 30 inserted into the bearing receiving bore of the idler arm end portion 70.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A bearing means for connecting an idler arm to a shaft, said idler arm having opposingly aligned counterbores loosely surrounding a shaft and defining a centrally bored web closely surrounding said shaft intermediate the ends of the latter, said bearing means comprising: a cylindrical housing having a wall diametrically reduced at one end portion and closely received at the end portion of the respective counterbore in said idler arm; a bearing race loosely surrounding said shaft within each said housing, said race having a conical recess; a bearing member loosely surrounding said shaft within each said housing and contiguously contacting the surface of the respective bearing race forming the conical recess; a tubular guide surrounding said shaft and extending outward from said web through and closely received by the bores of each said bearing race and said bearing member and a resilient member surrounding each said guide and bearing against said web and the adjacent surface of said bearing member.

2. A bearing means for connecting an idler arm to a shaft, said idler arm having opposingly aligned counterbores loosely surrounding a shaft and defining a centrally bored web therebetween, said web closely surrounding said shaft intermediate the ends of the latter, said bearing means comprising: a cylindrical housing having a wall forming an annular shoulder, intermediate its ends, positioned on a surface of the idler arm at the end of the respective counterbore and defining a reduced end portion of said housing closely received by the respective counterbore in said idler arm; a bearing race loosely surrounding said shaft within each said housing, said race having a conical recess; a bearing member loosely surrounding said shaft within each said housing and contiguously contacting the surface of the respective bearing race forming the conical recess; a tubular guide surrounding said shaft and extending outwardly from said web through the bores of each said bearing race and said bearing member and maintaining the respective said bearing race and said bearing member in coaxial alignment; and a resilient member surrounding said guide and bearing against said web and the adjacent surface of said bearing members.

3. Bearing means for interconnecting an idler arm and idler arm bracket for pivoting movement of the idler arm relative to the idler arm bracket, said idler arm bracket having parallel spaced-apart alignedly apertured members, a bolt extending through the apertures in said members, said idler arm having opposingly aligned counterbores loosely surrounding the respective end portions of said bolt and defining a centrally bored web therebetween, said web closely surrounding said bolt intermediate the ends of the latter, said bearing means comprising: a cylindrical housing having an outer wall diametrically reduced at one end portion and closely received by the counterbore in said idler arm; a first centrally bored antifriction member loosely surrounding said bolt and closely received by said housing; a second centrally bored antifriction member within said housing loosely surrounding said bolt and contiguously contacting the adjacent surface of said first antifriction member; a tubular guide surrounding said bolt on opposite sides of said web and snugly received by the bores in said first and second members; and a spring surrounding each said guide and extending at one end portion through the reduced end portion of said housing and resiliently contacting the adjacent surface of said second antifriction member.

4. Bearing means for interconnecting an idler arm and idler arm bracket for pivoting movement of the idler arm relative to the idler arm bracket, said idler arm bracket having parallel spaced-apart alignedly apertured members, a bolt extending through the apertures in said members, said idler arm having opposingly aligned counterbores loosely surrounding said bolt and defining a centrally bored web therebetween, said web closely surrounding said bolt intermediate the ends of the latter, said bearing means comprising: a cylindrical housing having an outer wall diametrically reduced at one end portion and closely received at the end portion of the respective counterbore in said idler arm, said housing wall forming an annular shoulder intermediate its ends; a first centrally bored antifriction member loosely surrounding said bolt and closely received by said housing; a second centrally bored antifriction member positioned adjacent the shoulder within said housing loosely surrounding said bolt and contiguously contacting the adjacent surface of said first antifriction member; a tubular guide surrounding said bolt on opposite sides of said web and snugly received by the bores in said first and second members; and a spring surrounding each said guide and extending at one end portion through the reduced end portion of said housing and resiliently contacting the adjacent surface of said second antifriction member.

5. Bearing means for interconnecting an idler arm and idler arm bracket for pivoting movement of the idler arm relative to the idler arm bracket, said idler arm bracket having parallel spaced-apart alignedly apertured members, a bolt extending through the apertures in said members, said idler arm having opposingly aligned counterbores loosely surrounding said bolt and defining a centrally bored web therebetween, said web closely surrounding said bolt intermediate the ends of the latter, said bearing means comprising: a cylindrical housing having a wall diametrically reduced at one end portion and closely received within the end portion of the respective counterbore in said idler arm; a bearing race within each said housing, each said bearing race having a conical-shaped recess; a conical-shaped bearing member nested by the recess in each said bearing race; a tubular guide closely surrounding said bolt on each side of said web and extending through and coaxially aligning each said bearing member and said bearing race; and resilient spring means interposed between said web and the respective said bearing member for maintaining the latter stationary with respect to the respective said guide.

References Cited by the Examiner
UNITED STATES PATENTS

| | | | |
|---|---|---|---|
| 603,400 | 5/1898 | Farmer | 308—70 |
| 2,324,997 | 7/1943 | Brown | 308—233 |
| 3,055,688 | 9/1963 | Melton et al. | 308—238 |
| 3,124,394 | 3/1964 | Rowlett | 308—238 |

ROBERT C. RIORDON, *Primary Examiner.*

FRANK SUSKO, *Examiner.*